(12) United States Patent
Ishiguro et al.

(10) Patent No.: US 9,152,967 B2
(45) Date of Patent: Oct. 6, 2015

(54) IMAGE FORMING APPARATUS, CONSUMABLES ORDERING SYSTEM AND CONSUMABLES ORDERING METHOD

(75) Inventors: Yasuyuki Ishiguro, Osaka (JP); Hisashi Kunihiro, Osaka (JP); Hitoshi Nagahama, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 592 days.

(21) Appl. No.: 13/349,207

(22) Filed: Jan. 12, 2012

(65) Prior Publication Data

US 2012/0185366 A1    Jul. 19, 2012

(30) Foreign Application Priority Data

Jan. 13, 2011   (JP) ................................ P2011-005339

(51) Int. Cl.
*G06Q 30/00*      (2012.01)
*G06Q 30/06*      (2012.01)

(52) U.S. Cl.
CPC .......... *G06Q 30/018* (2013.01); *G06Q 30/0643* (2013.01)

(58) Field of Classification Search
CPC ......................................... G06Q 30/00–30/08
USPC ................................................ 705/26.1–27.2
See application file for complete search history.

(56) References Cited

U.S. PATENT DOCUMENTS

2009/0314837 A1\* 12/2009 Kataoka et al. ............... 235/385
2011/0310428 A1\* 12/2011 Ciriza et al. ................. 358/1.15

FOREIGN PATENT DOCUMENTS

JP      2004-86414 A      3/2004
JP      2010-2442 A       1/2010

OTHER PUBLICATIONS

"Equipment-Based Print Markets". Anonymous. Printing Industries of America, The Magazine 2.1 (Jan. 2010): 72-84. Retrieved via ProQuest.\*

\* cited by examiner

*Primary Examiner* — Michael Misiaszek
(74) *Attorney, Agent, or Firm* — Birch, Stewart, Kolasch & Birch, LLP

(57) ABSTRACT

When a device desired to acquire emission right information is selected on a selection screen displayed on a display unit and a "SEND" icon is manipulated, a control unit causes the display unit to display consumables information of consumables granted with emission rights and consumables not granted with emission rights that is received from a server. When a user selects a consumable item that is desired to be ordered from among consumables indicated by the consumables information displayed on the display unit, and manipulates a "SEND ORDER SHEET" icon on the ordering screen, the control unit sends an order sheet to the server. The control unit causes the display unit to display, in the case of receiving order sheet receipt notification from the server in response to the sent order sheet, the received order sheet receipt notification.

7 Claims, 10 Drawing Sheets

IMAGE FORMING APPARATUS, CONSUMABLES ORDERING SYSTEM AND CONSUMABLES ORDERING METHOD

CROSS-REFERENCE TO RELATED APPLICATION

This application claims priority to Japanese Patent Application No. 2011-005339, which was filed on Jan. 13, 2011, the contents of which are incorporated herein by reference in its entirety.

BACKGROUND OF THE TECHNOLOGY

1. Field of the Technology

The present technology relates to an image forming apparatus, a consumables ordering system and a consumables ordering method capable of using consumables to which emission rights of greenhouse gases are granted.

2. Description of the Related Art

As an idea for reducing emissions of greenhouse gases such as carbon dioxide, a carbon offset has been proposed. The carbon offset means activities for compensating for all or a part of the emissions, which is difficult to be reduced even though citizens, companies, governments, and other social entities recognize their own greenhouse gas emissions and make efforts to voluntarily reduce their emissions together, by purchasing a reduction or absorption amount (hereinafter, referred to as "credits") of greenhouse gas emissions realized in other positions, carrying out projects and activities for reducing and absorbing greenhouse gas emissions in other positions, or the like.

As one carbon offset initiative, there is a trade in greenhouse gas emission rights. For example, emission rights, corresponding to greenhouse gas emission discharged to generate electricity consumed by the image forming apparatus during an operational time period in which consumables are used, are purchased by a manufacturer or a vendor as a credit on behalf of a user and are provided to the user who purchases the consumables. The image forming apparatus identifies consumables having the emission right and manages exchange, recovery, and the like of the identified consumables. For example, as a credit, there is a Kyoto mechanism credit issued on the basis of procedures determined by the Kyoto Protocol.

As a conventional art concerning transfer of emission rights of greenhouse gases, there is an electronic apparatus that is described in Japanese Unexamined Patent Publication JP-A 2010-2442. This electronic apparatus uses a consumables unit that is sold in a form in which emission rights of greenhouse gases are granted as a consumables unit attachable/detachable to/from the electronic apparatus. Then, evaluation is performed for reduction of greenhouse gases according to a continued usage state of this consumables unit, and the evaluation result is displayed on a manipulation panel or the like, or printed on a sheet. Thereby, user's awareness of greenhouse gas reduction is attempted to be increased.

However, in the above-described conventional art, the consumables unit that is sold in the form in which emission rights of greenhouse gases are granted is used, thus making it possible to increase user's awareness of greenhouse gas reduction, however, for a user who uses consumables at extremely less use frequency, or a user who extremely less frequently uses an image forming apparatus, purchase of consumables to which the emission rights are granted increases a burden by expense of the emission rights that are granted to the consumables. Such a user purchases an image forming apparatus with the conventional art only capable of using consumables to which the emission rights are not granted, and tends to avoid purchase of consumables to which the emission rights are granted or an image forming apparatus to which the emission rights are granted.

SUMMARY OF THE TECHNOLOGY

An object of the technology is to provide an image forming apparatus, a consumables ordering system and a consumables ordering method capable of using not only consumables granted with emission rights but also consumables not granted with emission rights according to use frequency of the image forming apparatus by a user so that it is possible to promote sales of the image forming apparatus granted with emission rights.

The technology provides an image forming apparatus including:

an acquisition unit that acquires information of consumables granted with emission rights and information of consumables not granted with emission rights of consumables capable of being used in the image forming apparatus, from a server that stores information of consumables granted with emission rights indicating consumables granted with emission rights to which emission rights of greenhouse gases are granted and information of consumables not granted with emission rights indicating consumables not granted with emission rights to which emission rights of greenhouse gases are not granted;

a display unit that displays the information of consumables granted with emission rights and the information of consumables not granted with emission rights that are acquired by the acquisition unit;

a selection unit that selects consumables to be ordered from among consumables granted with emission rights indicated by the information of consumables granted with emission rights and consumables not granted with emission rights indicated by the information of consumables not granted with emission rights that are displayed on the display unit; and an ordering unit that orders the consumables selected by the selection unit to the server.

The acquisition unit acquires information of consumables granted with emission rights and information of consumables not granted with emission rights of consumables capable of being used in the image forming apparatus, from a server that stores information of consumables granted with emission rights indicating consumables granted with emission rights to which emission rights of greenhouse gases are granted and information of consumables not granted with emission rights indicating consumables not granted with emission rights to which emission rights of greenhouse gases are not granted. The display unit displays the information of consumables granted with emission rights and the information of consumables not granted with emission rights that are acquired by the acquisition unit. The selection unit selects consumables to be ordered from among consumables granted with emission rights indicated by the information of consumables granted with emission rights and consumables not granted with emission rights indicated by the information of consumables not granted with emission rights that are displayed on the display unit. Then, the ordering unit orders the consumables selected by the selection unit to the server.

Therefore, it is possible to promote sales of an image forming apparatus granted with emission rights which enables use of not only consumables granted with emission rights but also consumables not granted with emission rights according to use frequency of the image forming apparatus by a user. Additionally, it is possible to broaden user's choices for contributions to environment, thus enabling cost reduction without paying cost of emission rights for consumables extremely less frequently used by the user. Further, a user with high environmental awareness is able to acknowledge at one view environmental performances of consumables to purchase in relief consumables granted with emission rights, and eventually able to suppress a greenhouse gas yield to contribute to prevention of global warming. Moreover, a dealer of consumables is also able to make an appeal of addressing environmental issues to a user, which leads to increase of sales of consumables.

Further, it is preferable that the information of consumables granted with emission rights and the information of consumables not granted with emission rights include carbon footprint information indicating carbon footprint of consumables.

The information of consumables granted with emission rights and the information of consumables not granted with emission rights include carbon footprint information indicating carbon footprint of consumables. Therefore, it is possible for a user to select consumables in consideration of carbon dioxide equivalents of consumables and purchase consumables having high environmental performances so that it is possible to respond to environmental awareness of a user. Additionally, a user with high environmental awareness is able to acknowledge at one view environmental performances of consumables while it is possible to meet the needs of the user, which also leads to increase of sales of consumables for a dealer or a leasing store of consumables.

Further, it is preferable that the information of consumables granted with emission rights and the information of consumables not granted with emission rights further include consumables identification information that identifies consumables, and the display unit displays carbon footprint information for each piece of the consumables identification information.

The information of consumables granted with emission rights and the information of consumables not granted with emission rights further include consumables identification information that identifies consumables, and the display unit displays carbon footprint information for each piece of the consumables identification information. Therefore, a user is able to get consumables information of consumables.

Further, it is preferable that the ordering unit includes:

an order sheet preparation unit that prepares an order sheet for ordering consumables selected by the selection unit; and a sending unit that sends the order sheet prepared by the order sheet preparation unit to the server.

The ordering unit includes an order sheet preparation unit that prepares an order sheet for ordering consumables selected by the selection unit, and a sending unit that sends the order sheet prepared by the order sheet preparation unit to the server. Therefore, a user is able to make a written order with an order sheet, and it is also possible for the user to check the prepared order sheet, thereafter ordering.

Further, it is preferable that the image forming apparatus includes a receiving unit that receives order sheet receipt notification that is returned in response to an order sheet sent by the sending unit, and the display unit displays the order sheet receipt notification received by the receiving unit.

The image forming apparatus includes a receiving unit that receives order sheet receipt notification that is returned in response to an order sheet sent by the sending unit, and the display unit displays the order sheet receipt notification received by the receiving unit. Therefore, a user is able to confirm receipt of the order sheet by the server.

Further, it is preferable that the display unit is composed of a touch panel.

The display unit is composed of a touch panel. Therefore, the touch panel integrally provided with a manipulation unit is used as the display unit of the image forming apparatus so that it is possible to easily acquire directly from the server and display consumables information. Additionally, it is possible to easily select consumables having further improved environmental performances, which facilitates ordering to a dealer or a leasing store of consumables.

Further, the technology provides a consumables ordering system including an image forming apparatus, and a server that stores information of consumables that are used in the image forming apparatus including consumables granted with emission rights indicating consumables granted with emission rights to which emission rights of greenhouse gases are granted and consumables not granted with emission rights indicating consumables not granted with emission rights to which emission rights of greenhouse gases are not granted, the image forming apparatus including:

an acquisition unit that acquires from a server information of consumables granted with emission rights and information of consumables not granted with emission rights of consumables capable of being used in the image forming apparatus;

a display unit that displays the information of consumables granted with emission rights and the information of consumables not granted with emission rights that are acquired by the acquisition unit;

a selection unit that selects consumables to be ordered from among consumables granted with emission rights indicated by the information of consumables granted with emission rights and consumables not granted with emission rights indicated by the information of consumables not granted with emission rights that are displayed on the display unit; and an ordering unit that orders the consumables selected by the selection unit to the server.

A consumables ordering system includes an image forming apparatus, and a server that stores information of consumables that are used in the image forming apparatus including consumables granted with emission rights indicating consumables granted with emission rights to which emission rights of greenhouse gases are granted and consumables not granted with emission rights indicating consumables not granted with emission rights to which emission rights of greenhouse gases are not granted. The image forming apparatus includes an acquisition unit, a display unit, a selection unit and an ordering unit. In the case of ordering consumables in the consumables ordering system, the acquisition unit acquires from the server information of consumables granted with emission rights and information of consumables not granted with emission rights of consumables capable of being used in the image forming apparatus. The display unit displays the information of consumables granted with emission rights and the information of consumables not granted with emission rights that are acquired by the acquisition unit. The selection unit selects consumables to be ordered from among consumables granted with emission rights indicated by the information of consumables granted with emission rights and consumables not granted with emission rights indicated by the information of consumables not granted with emission rights that are displayed on the display unit. Then, the ordering unit orders the consumables selected by the selection unit to the server.

Therefore, it is possible to promote sales of an image forming apparatus granted with emission rights which enables use of not only consumables granted with emission rights but also consumables not granted with emission rights according to use frequency of the image forming apparatus by a user. Additionally, it is possible to broaden user's choices for contributions to environment, thus enabling cost reduction without paying cost of emission rights for consumables extremely less frequently used by a user. Further, a user with high environmental awareness is able to acknowledge at one view environmental performances of consumables to purchase in relief consumables granted with emission rights, and eventually able to suppress a greenhouse gas yield to contribute to prevention of global warming. Moreover, a dealer of consumables is also able to make an appeal of addressing environmental issues to a user, which leads to increase of sales of consumables.

Further, the technology provides a consumables ordering method executed in a consumables ordering system including an image forming apparatus, and a server that stores information of consumables that are used in the image forming apparatus including consumables granted with emission rights indicating consumables granted with emission rights to which emission rights of greenhouse gases are granted and consumables not granted with emission rights indicating consumables not granted with emission rights to which emission rights of greenhouse gases are not granted, the consumables ordering method including:

an acquisition step of acquiring from the server information of consumables granted with emission rights and information of consumables not granted with emission rights of consumables capable of being used in the image forming apparatus;

a displaying step of displaying the information of consumables granted with emission rights and the information of consumables not granted with emission rights that are acquired in the acquisition step;

a selection step of selecting consumables to be ordered from among consumables granted with emission rights indicated by the information of consumables granted with emission rights and consumables not granted with emission rights indicated by the information of consumables not granted with emission rights that are displayed on the display unit in the displaying step; and an ordering step of ordering the consumables selected in the selection step to the server.

In the case of ordering consumables in a consumables ordering system including an image forming apparatus, and a server that stores information of consumables that are used in the image forming apparatus including consumables granted with emission rights indicating consumables granted with emission rights to which emission rights of greenhouse gases are granted and consumables not granted with emission rights indicating consumables not granted with emission rights to which emission rights of greenhouse gases are not granted, information of consumables granted with emission rights and information of consumables not granted with emission rights of consumables capable of being used in the image forming apparatus is acquired from the server in an acquisition step. In a displaying step, the information of consumables granted with emission rights and the information of consumables not granted with emission rights that are acquired in the acquisition step are displayed on the display unit. In a selection step, consumables to be ordered are selected from among consumables granted with emission rights indicated by the information of consumables granted with emission rights and consumables not granted with emission rights indicated by the information of consumables not granted with emission rights that are displayed on the display unit in the displaying step.

Then, in an ordering step, the consumables selected in the selection step are ordered to the server.

Therefore, it is possible to promote sales of an image forming apparatus granted with emission rights which enables use of not only consumables granted with emission rights but also consumables not granted with emission rights according to use frequency of the image forming apparatus by a user. Additionally, it is possible to broaden user's choices for contributions to environment, thus enabling cost reduction without paying cost of emission rights for consumables extremely less frequently used by a user. Further, a user with high environmental awareness is able to acknowledge at one view environmental performances of consumables to purchase in relief consumables granted with emission rights, and eventually able to suppress a greenhouse gas yield to contribute to prevention of global warming. Moreover, a dealer of consumables is also able to make an appeal of addressing environmental issues to a user, which leads to increase of sales of consumables.

BRIEF DESCRIPTION OF THE DRAWINGS

Other and further objects, features, and advantages of the technology will be more explicit from the following detailed description taken with reference to the drawings wherein.

DETAILED DESCRIPTION

Figure 1:
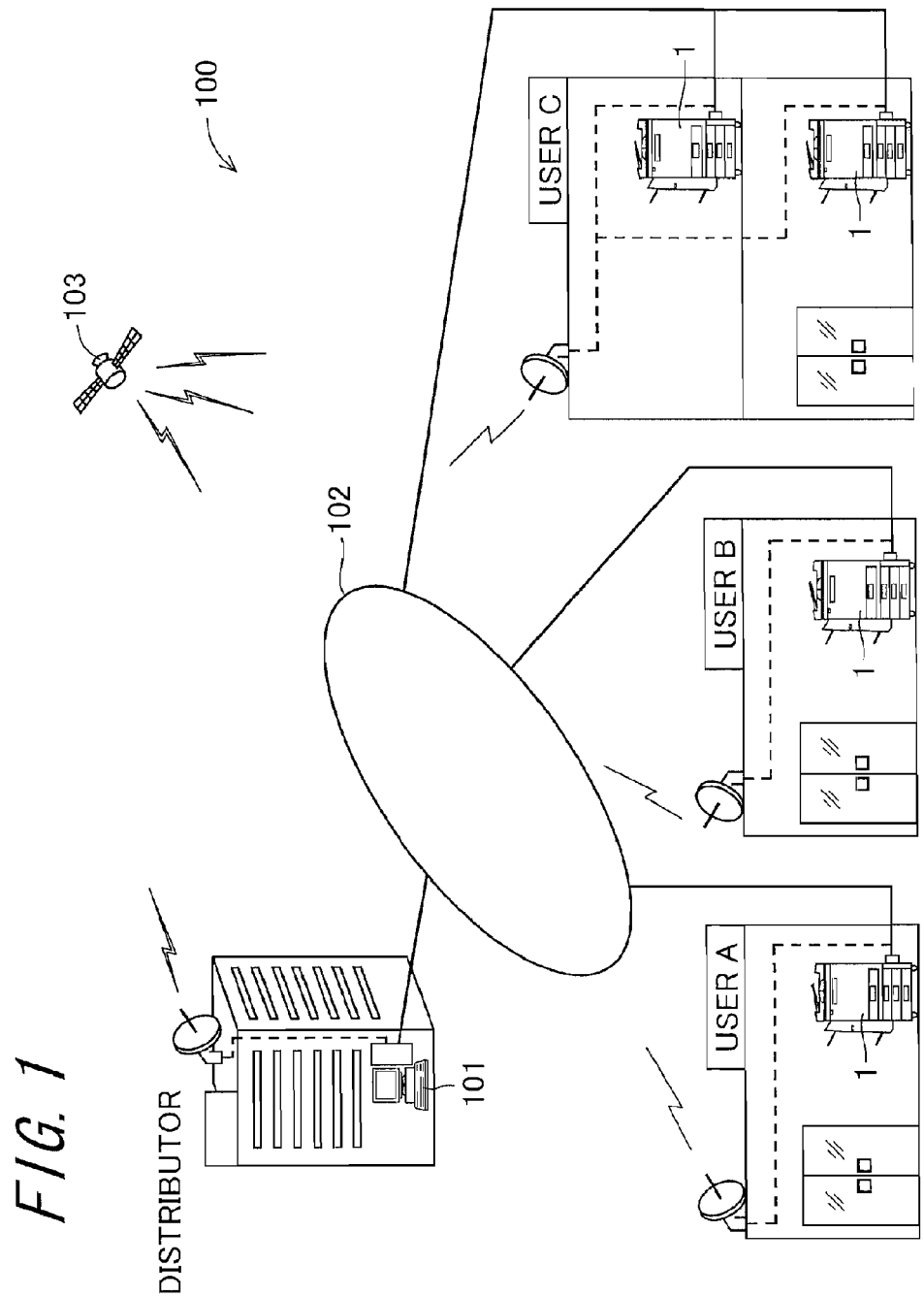
FIG. 1 is a diagram schematically illustrating a configuration of a consumables ordering system according to an embodiment.

Now referring to the drawings, preferred embodiments are described below.

FIG. 1 is a diagram schematically illustrating a configuration of a consumables ordering system 100 according to an embodiment. A consumables ordering method according to the embodiment is executed in the consumables ordering system 100. The consumables ordering system 100 includes an image forming apparatus 1 and a server 101. One server 101 is included therein, and one or more image forming apparatuses 1 may be included therein.

The image forming apparatus 1 and the server 101 are connected with a local area network (hereinafter, referred to as a "LAN") 102, and information can be sent and received between the server 101 and the image forming apparatus 1. The communication between the image forming apparatus 1 and the server 101 is not limited to the LAN 102, but may also be available in communication networks such as the Internet, communication lines via a satellite communication apparatus 103, and Intranet, Extranet, ISDN (Integrated Services Digital Network), VAN (Value Added Network), CATV (Community Antenna Television) communication networks, virtual private networks, telephone networks, mobile communication networks, and satellite communication networks and the like. In addition, a transmission medium of the communication network is not particularly limited, but may include, for example, a wired line such as IEEE (Institute of Electrical and Electronic Engineers) 1394, USB (Universal Serial Bus), power line communication, cable TV communication, telephone lines, ADSL (Asymmetric Digital Subscriber Line), an infrared radiation such as IrDA (Infrared Data Association) or Remote controller, wireless communication such as Bluetooth (registered trademark), 802.11 wireless, HDR (High Data Rate), cellular phone networks, satellite communication network, and digital terrestrial networks. In addition, the technology may be realized in the form of computer data signals embedded in carrier waves by which the program codes are embodied as the electronic transmission.

Hereinafter, it is assumed that information can be sent and/or received using an e-mail, facsimile communication, or the like as well as in the form of directly sending and/or receiving information between the image forming apparatus 1 and the server 101 using the LAN 102.

The server 101 is provided at a distributor such as a dealer or a leasing store, or a cloud provider which provides a cloud computing service, and the image forming apparatus 1 is provided in environment where the image forming apparatus 1 is usable such as a user's company, office, store, or the like. A dealer or a leasing store (hereinafter, simply referred to as "dealer") delivers, when receiving from the image forming apparatus 1 an order for consumables that are used in the image forming apparatus 1, the ordered consumables to a user who ordered for sale in exchange of the payment.

The server 101 has a server storage unit (not shown) that stores consumables information indicating consumables that are used in the image forming apparatus 1. The server 101 reads from the server storage unit, in response to an offer request of the consumables information from the image forming apparatus 1, the requested consumables information of consumables capable of being used in the image forming apparatus 1, and sends the read consumables information to the image forming apparatus 1. Moreover, the server 101 performs ordering process in response to an ordering request of consumables from the image forming apparatus 1.

Consumables include, for example, a toner cartridge for printing. The consumables include consumables granted with emission rights to which emission rights of greenhouse gases are granted and consumables not granted with emission rights to which emission rights of greenhouse gases are not granted. Such emission rights are to provide a user who purchases consumables with rights equal to greenhouse gases that are emitted in order to generate electricity which are consumed during a period when the image forming apparatus 1 is operated using the consumables, which are purchased by a manufacturer/distributor of the consumables as credit in place of the user. Consumables information includes information of consumables granted with emission rights indicating consumables granted with emission right and information of consumables not granted with emission rights indicating consumables not granted with emission rights.

Figure 2:
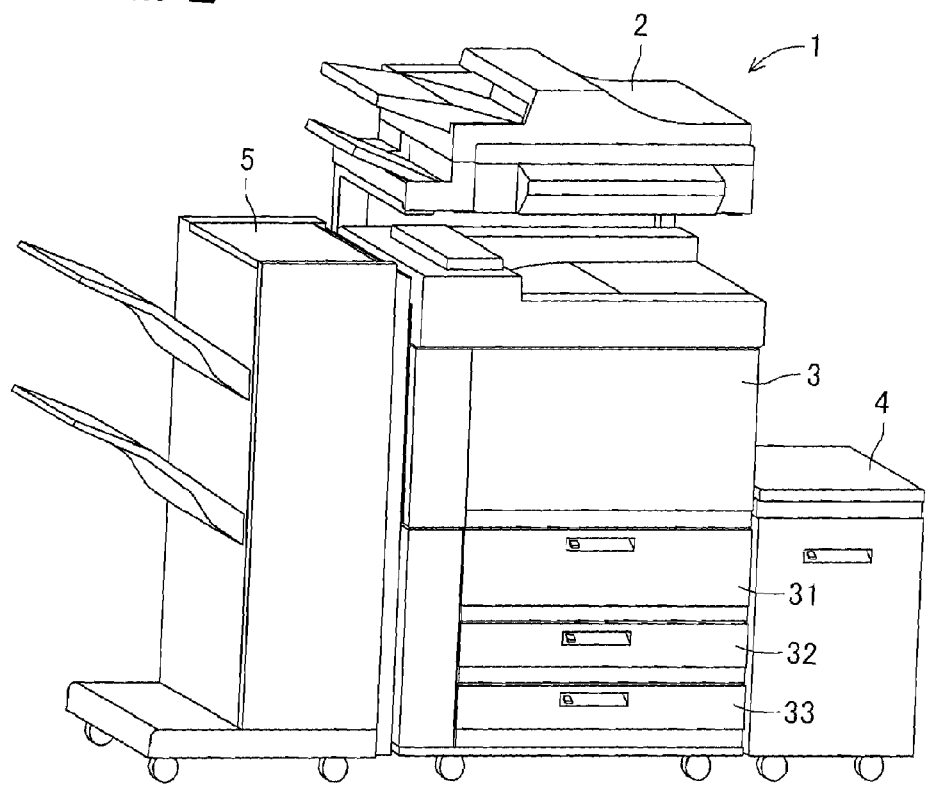
FIG. 2 is a perspective diagram illustrating appearance of an image forming apparatus.
Figure 3:
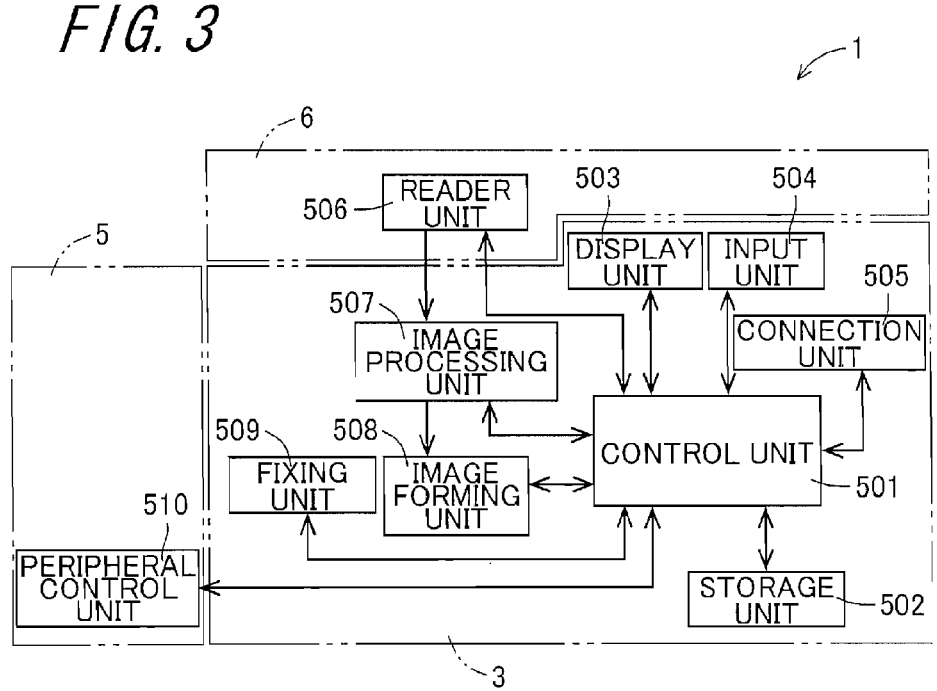
FIG. 3 is a block diagram illustrating a configuration of the image forming apparatus.
Figure 4A:
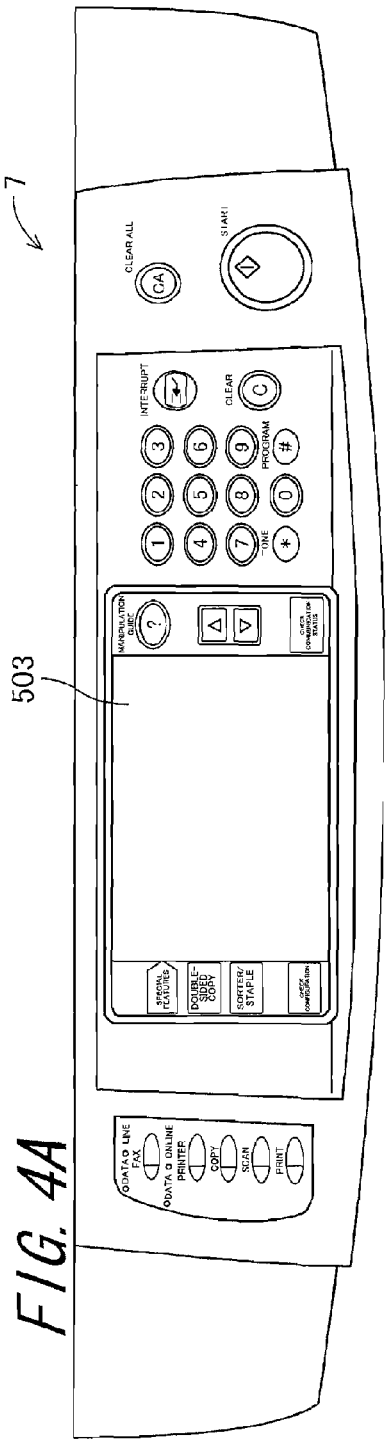
FIGS. 4A and 4B are diagrams illustrating appearance of a manipulation panel.
Figure 4B:
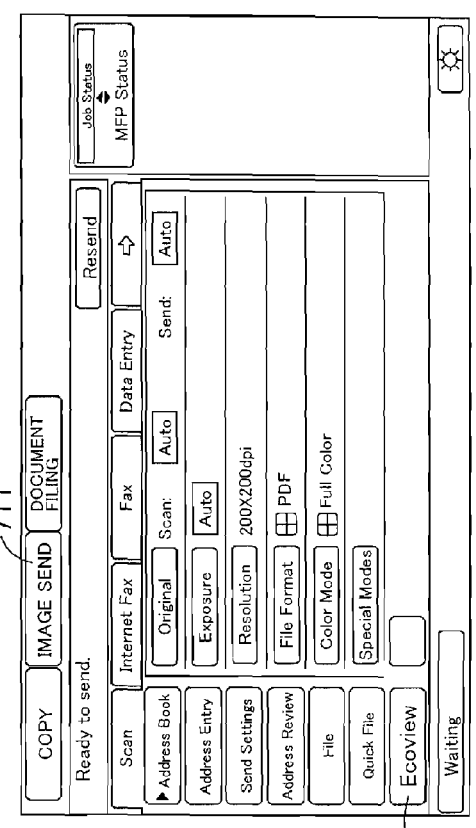

FIG. 2 is a perspective diagram illustrating appearance of the image forming apparatus 1. FIG. 3 is a block diagram illustrating a configuration of the image forming apparatus 1. FIGS. 4A and 4B are diagrams illustrating appearance of a manipulation panel 7. The image forming apparatus 1 is able to perform at least printing and ordering of consumables. The image forming apparatus 1 includes a document feeder 2, an image forming apparatus main body 3, a mass sheet feeder 4, a sorter 5, a scanner 6, a manipulation panel 7 and sheet feeders 31, 32 and 33.

The document feeder 2 feeds an original to the scanner 6 one by one. The image forming apparatus main body 3 includes a control unit 501, a storage unit 502, a display unit 503, an input unit 504, an image processing unit 507, an image forming unit 508 and a fixing unit 509. The image forming apparatus main body 3 prints information such as image information read by the scanner 6, image information acquired via a LAN 102, or image information read from a removable recording medium.

The control unit 501 is configured by, for example, a central processing unit (hereinafter, referred to as "CPU"), and executes a program that is stored in the storage unit 502 so as to control the display unit 503, the input unit 504, a connection unit 505, the image processing unit 507, the image forming unit 508, the fixing unit 509, the document feeder 2, the mass sheet feeder 4, the sorter 5, the scanner 6, the manipulation panel 7 and the sheet feeders 31 to 33.

The storage unit 502 is configured by a storage device such as a semiconductor memory, an HDD (Hard Disk Drive) and a Blu-ray disc, for example, and stores a program executed by the CPU and information required for executing the program by the CPU. For the information stored in the storage unit 502, writing and reading are performed by the CPU.

The display unit 503 is a display device provided in the manipulation panel 7, and composed of a touch panel, for example. The display unit 503 displays information instructed from the control unit 501. FIG. 4A is a front view of the manipulation panel 7. The manipulation panel 7 has the display unit 503 that is provided at a central part thereof, and has a plurality of manipulation buttons that are provided on both sides of the display unit 503.

The input unit 504 that is a selection unit, is configured by manipulation buttons provided in the manipulation panel 7 and manipulation icons provided on a display screen of the display unit 503. When the manipulation button and the manipulation icon are manipulated, the input unit 504 sends to the control unit 501 information indicating the manipulated manipulation button and manipulation icon. The information indicating the manipulation icon is information indicating a position where a user's finger is touched on the display screen, however, the control unit 501 gets a position where the manipulation icon is displayed on the display screen, and is thus able to recognize which manipulation icon is manipulated based on the information indicating a position where a user's finger is touched that is received from the input unit 504.

The connection unit 505 is a recording device on which a removable recording medium such as, for example, a universal serial bus (abbreviation: "USB") memory or a memory card is mounted, and which performs writing and reading of information to/from the removable recording medium, and a communication device for sending/receiving information to/from the server 101. The connection unit 505 sends to the control unit 501 information read from the removable recording medium and information received from the server 101, and writes to the removable recording medium or sends to the server 101 the information received from the control unit 501.

The image processing unit 507 converts image information received from a reader unit 506 or image information received from the control unit 501 into a print format which is instructed from the control unit 501 to be sent to the image forming unit 508. The print format is a format of, for example, a print size, resolution, a color or the like. The image forming unit 508 prints the image information received from the image processing unit 507 on a sheet as an image. The fixing unit 509 fixes the image printed on the sheet by the image forming unit 508.

The mass sheet feeder 4 holds a lot of sheets for printing and sequentially feeds the sheet to the image forming apparatus main body 3 according to the instruction from the image forming apparatus main body 3. The sorter 5 includes a peripheral control unit 510 and sorts and discharges the printed sheets. The peripheral control unit 510 sorts the printed sheets in the image forming apparatus main body 3 according to the instruction from the control unit 501 and discharges them to a target stacker among a plurality of stackers. The sorter 5 is a peripheral device, and a post processing device such as a finisher may be used as the peripheral device instead of the sorter 5. The finisher is a post processing device similar to the sorter 5, and has special functions of a Z fold of a sheet, folding an A3-size sheet in half into an A4-size sheet, and the like.

The scanner 6 includes the reader unit 506 and reads the original fed from the document feeder 2 by the reader unit 506. The reader unit 506 reads the original and sends the image information representing an image of read original to the image processing unit 507 or the control unit 501. The sheet feeders 31 to 33 can hold sheets having different sizes, and any one of sheet feeders 31 to 33 feeds the sheet of the print size instructed from the image forming apparatus main body 3 to the image forming apparatus main body 3.

FIG. 4B is a diagram illustrating an example of an IMAGE SEND initial screen 71. The control unit 501 causes the display screen of the display unit 503 to display main menu icons including an IMAGE SEND icon 711 as an initial screen when both the image forming apparatus 1 and the server 101 are powered up and operable. The control unit 501 causes the display unit 503 to display the IMAGE SEND initial screen 71 when a user manipulates the IMAGE SEND icon 711 out of the main menu icons.

The main menu icons also appear at the top of the IMAGE SEND initial screen 71. The IMAGE SEND initial screen 71 displays a plurality of submenu icons in the left edge thereof. The control unit 501 performs control such that a selection screen 72 is displayed on the display unit 504 when an Eco-view icon 712 is manipulated out of the plurality of submenu icons.

Figure 5:
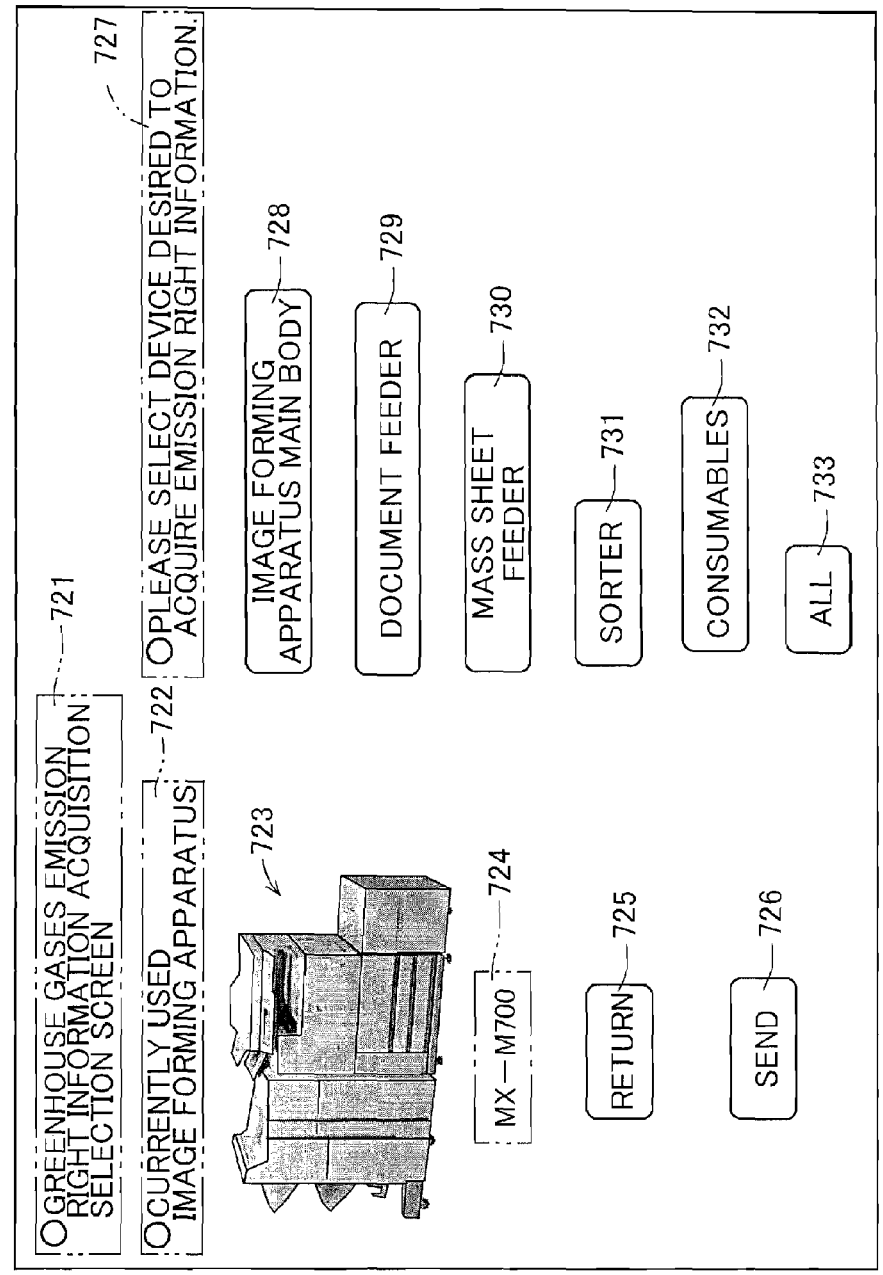
FIG. 5 is a diagram illustrating an example of a selection screen.

FIG. 5 is a diagram illustrating an example of the selection screen 72. The selection screen 72 is a screen for selecting the device desired to acquire the emission right information from the server 101. The selection screen 72 includes a screen title field 721, a target device title field 722, a target device image field 723, a target device type field 724, a "RETURN" icon 725, a "SEND" icon 726, a device selection message field 727, a "IMAGE FORMING APPARATUS MAIN BODY" icon 728, a "DOCUMENT FEEDER" icon 729, a "MASS SHEET FEEDER" icon 730, a "SORTER" icon 731, a "CONSUMABLES" icon 732, and an "ALL" icon 733.

The screen title field 721 is a field for indicating the title of the selection screen 72. In FIG. 5, "○ GREENHOUSE GAS EMISSION RIGHT INFORMATION ACQUISITION SELECTION SCREEN" is illustrated. The target device title field 722 is a field that displays the image forming apparatus 1 currently used, and in FIG. 5, "○ CURRENTLY USED IMAGE FORMING APPARATUS" is illustrated. The target device image field 723 is a field that displays an image showing the appearance of the image forming apparatus 1. The target device type field 724 is a field that displays a type of the image forming apparatus 1, and in FIG. 5, "MX-M700" is illustrated. The "RETURN" icon 725 is a manipulation icon for going back to the previous screen. The "SEND" icon 726 is a manipulation icon for sending the device information to the server 101 indicated by the icon representing the device in the manipulation icon chosen from the manipulation icons that appear below the device selection message field 727.

The device selection message field 727 is a field that displays a message for prompting a user to select a device desired to acquire the emission right information, and in FIG. 5, "○ PLEASE SELECT DEVICE DESIRED TO ACQUIRE EMISSION RIGHT INFORMATION" is illustrated. The "IMAGE FORMING APPARATUS MAIN BODY" icon 728, "DOCUMENT FEEDER" icon 729, "MASS SHEET FEEDER" icon 730, "SORTER" icon 731, "CONSUMABLES" icon 732, and "ALL" icon 733 are displayed below the device selection message field 727 as selectable manipulation icons.

The "IMAGE FORMING APPARATUS MAIN BODY" icon 728 is a manipulation icon for instructing selection of "IMAGE FORMING APPARATUS MAIN BODY". The "DOCUMENT FEEDER" icon 729 is a manipulation icon for instructing selection of "DOCUMENT FEEDER". The "MASS SHEET FEEDER" icon 730 is a manipulation icon for instructing selection of "MASS SHEET FEEDER". The "SORTER" icon 731 is a manipulation icon for instructing selection of "SORTER". The "CONSUMABLES" icon 732 is a manipulation icon for instructing selection of "CONSUMABLES". The "ALL" icon 733 is a manipulation icon for instructing selection of all devices such as "IMAGE FORMING APPARATUS MAIN BODY", "DOCUMENT FEEDER", "MASS SHEET FEEDER", "SORTER", and "CONSUMABLES".

The information displayed as the IMAGE SEND initial screen 71 is stored in the storage unit 502 in advance, and the control unit 501 reads the information from the storage unit 502 and sends the read information to the display unit 503 to display it.

In the embodiment, for example, when a user desires to purchase consumables, the user selects the "CONSUMABLES" icon 732, thereafter manipulating the "SEND" icon 726. The control unit 501 requests, in the case of being informed from the input unit 504 that the "CONSUMABLES" icon 732 is selected and the "SEND" icon 726 is manipulated, consumables information of consumables capable of being used in the image forming apparatus 1 to the server 101 via the connection unit 505.

The server 101 reads, when consumables information is requested from the image forming apparatus 1, consumables information usable in the image forming apparatus 1 from among consumables information that is stored in the server storage unit to send the read consumables information to the image forming apparatus 1. The control unit 501 stores in the storage unit 502, in the case of receiving consumables information from the server 101 via the connection unit 505 as well as displaying on the display unit 503, the received consumables information. The control unit 501 and the connection unit 505 serve as an acquisition unit.

The control unit 501 receives, in the case of receiving consumables information, a server-provided ordering processing program from the server 101, and stores the received server-provided ordering processing program in the storage unit 502. The server-provided ordering processing program is a program for executing by the control unit 501 processing on each screen shown in FIGS. 6 to 9.

The control unit 501 stores the server-provided ordering processing program in the storage unit 502, thereafter executing the server-provided ordering processing program stored in the storage unit 502 until ordering process of consumables is terminated. The control unit 501 erases, after terminating the ordering process of consumables, the server-provided ordering processing program stored in the storage unit 502.

In this manner, the image forming apparatus 1 receives from the server 101 of a dealer and executes the server-provided ordering processing program, and it is thus possible to execute inherent ordering process of each dealer, so that it is possible to purchase consumables without being constrained by the server-provided ordering processing program that is provided by a manufacturer/distributor of one of the consumables.

Figure 6:
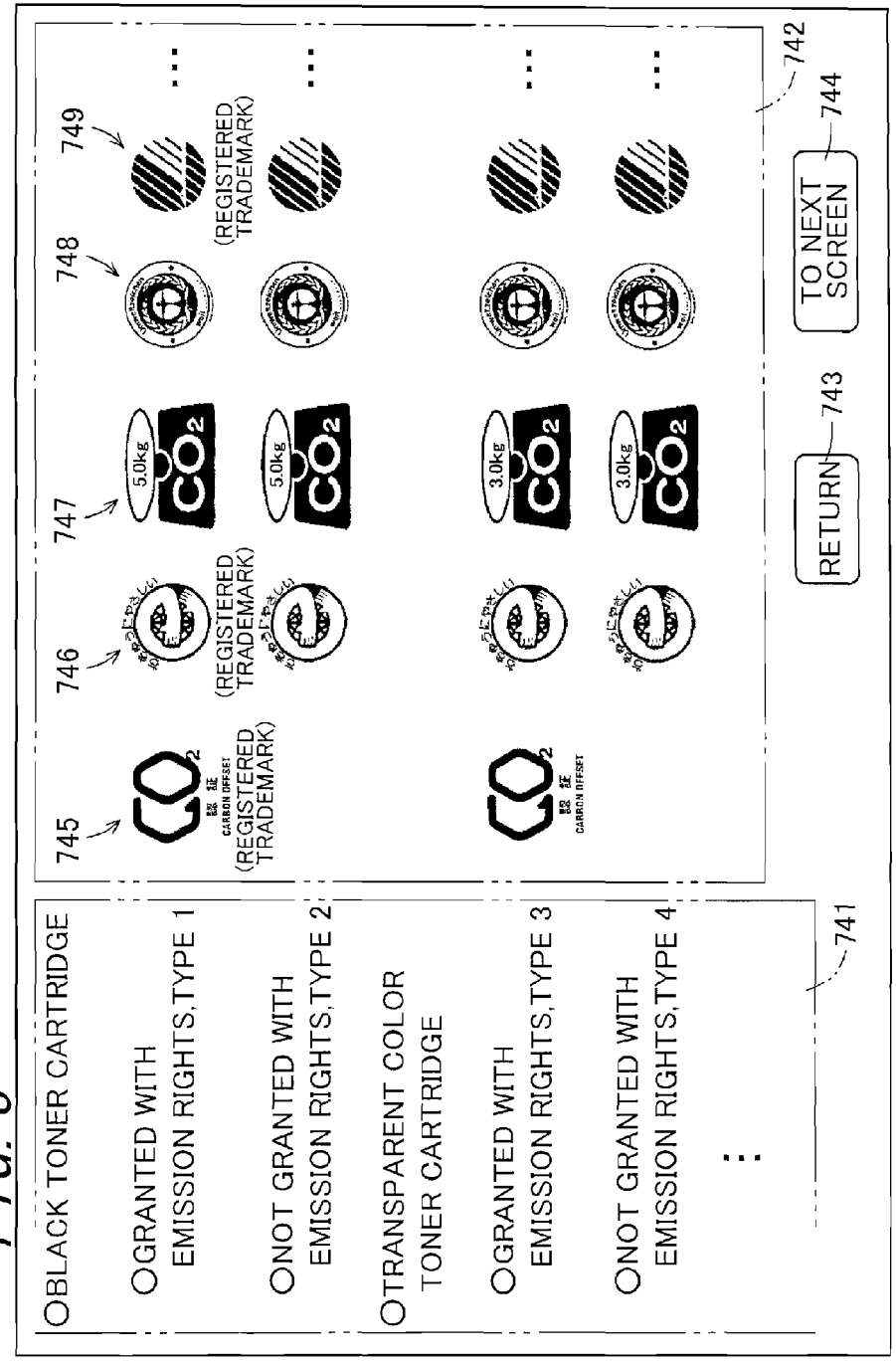
FIG. 6 is a diagram illustrating an example of a consumables list screen.

FIG. 6 is a diagram illustrating an example of a consumables list screen 74. The consumables list screen 74 is a screen for displaying a list of consumables capable of being purchased in the image forming apparatus 1. The control unit 501 causes the display unit 503 to display consumables information received from the server 101 as the consumables list screen 74.

The consumables list screen 74 is provided with a consumables list display field 741, an environmental mark thumbnail display field 742, a "RETURN" icon 743 and a "TO NEXT SCREEN" icon 744. The consumables list display field 741 is a field for displaying a consumable item name, granted with or not granted with emission rights and model numbers concerning consumables capable of being used in the image forming apparatus 1. The consumable item name is a name of a consumable item. Whether it is granted with or not granted with emission rights is displayed as "○ Granted with emission rights" when emission rights are granted, and displayed as "○ Not granted with emission rights" when emission rights are not granted. The model number is consumables identification information for identifying consumables.

The environmental mark thumbnail display field 742 is a field for displaying for each piece of consumables marks such as a carbon offset mark (registered trademark) 745, an Eco Mark (registered trademark) 746, a carbon footprint mark 747, a Blue Angel Mark 748 and a Nordic Swan Mark (registered trademark) 749. In the environmental mark thumbnail display field 742, a mark acquired for consumables and a mark certified or authorized for consumables are indicated in a thumbnail form.

The Carbon Offset Mark (registered trademark) 745 that is carbon footprint information is a mark indicating that certification of the carbon offset certification system is obtained, and consumables with this mark indicate that emission rights are granted therefor. The Eco Mark (registered trademark) 746 is a mark indicating that accreditation is received from Japan Environment Association.

The carbon footprint mark 747 is a mark indicating that verification has been conducted by the carbon footprint system. The carbon footprint system means a structure that converts an emission amount of greenhouse gases emitted through the whole life cycle from procurement of raw materials of commodities/services to disposal/recycle to carbon dioxide (hereinafter, referred to as "$CO_2$") so as to be displayed for the commodity and the service in a simple way in an easily understood manner.

There are six types of greenhouse gases including $CO_2$, methane (hereinafter, referred to as "$CH_4$"), nitrous oxide (hereinafter, referred to as "$N_2O$"), hydrofluorocarbon (hereinafter, referred to as "HFCs"), perfluorocarbon (hereinafter, referred to as "PFCs") and sulfur hexafluoride (hereinafter, referred to as "$SF_6$") that became targets in the Kyoto Protocol. In the carbon footprint mark 747, a character "$CO_2$" and a $CO_2$ equivalent (kg) are indicated. The $CO_2$ equivalent is a value in which an emission amount of greenhouse gases in the whole life cycle of the consumable is converted to an emission amount of $CO_2$. Note that, it is also possible to indicate an explanatory text explaining the carbon footprint mark together therewith.

The emission amount of $CO_2$ is calculated by using a general formula determined in the carbon footprint system. The general formula is calculated by utilizing a life cycle assessment (LCA) technique and can be expressed as the following formula (1).

$$\text{emission amount of } CO_2 = \Sigma(\text{amount of activity } i \times CO_2 \text{ emissions per unit}) \quad (1)$$

In the formula, i denotes an amount of activity (process) of a life cycle phase from raw material acquisition to disposal and recycling.

The life cycle phase and the amount of activity may correspond to the following (a) to (e):

(a) the amount of activity in the raw materials acquisition phase is a material use amount;

(b) the amount of activity in the production phase is an assembly weight and a power consumption during production;

(c) the amount of activity in the distribution phase is a transport amount (a product of a transportation distance, a loading ratio, and a truck loading amount);

(d) the amount of activity in the use and maintenance phase is a power consumption during the use; and (e) the amount of activity in the disposal and recycling phase is a landfill weight and a recycling weight.

A unit indicated in the carbon footprint mark 747 shown in FIG. 6 is kilogram (kg), however, a unit indicating weight such as gram (g) or ton (t) may be used.

The Blue Engel Mark 748 is an eco mark of Germany, and a mark indicating that accreditation is received from the Blue Angel system. The Nordic Swan Mark (registered trademark) 749 is a mark indicating that certification of the eco label system officially authorized by Nordic countries is obtained.

In this manner, in the environmental mark thumbnail display field 742, marks other than the Carbon Offset Mark (registered trademark) 745 are also displayed, and it is thus possible for a user to select and purchase consumables further meeting environmental standards.

The "RETURN" icon 743 is a manipulation icon for returning to a last screen. The "TO NEXT SCREEN" icon 744 is a manipulation icon for displaying a next screen.

In FIG. 6, in the consumables list display field 741, "○ GRANTED WITH EMISSION RIGHTS, TYPE 1" and "○ NOT GRANTED WITH EMISSION RIGHTS, TYPE 2" as "○ BLACK TONER CARTRIDGE", as well as "○ GRANTED WITH EMISSION RIGHTS, TYPE 3" and "○ NOT GRANTED WITH EMISSION RIGHTS, TYPE 4" as "○ TRANSPARENT COLOR TONER CARTRIDGE" are displayed. The "BLACK TONER CARTRIDGE" is a common cartridge filled with a black toner. The "TRANSPARENT COLOR TONER CARTRIDGE" is a toner capable of including wrapping in a top layer of a color image layer, and a cartridge of a toner capable of further improving a gloss performance and fixability of a color image.

In the environmental mark thumbnail display field 742, for "○ GRANTED WITH EMISSION RIGHTS, TYPE 1", the Carbon Offset Mark (registered trademark) 745, the Eco Mark (registered trademark) 746, the carbon footprint mark 747, the Blue Engel Mark 748 and the Nordic Swan Mark (registered trademark) 749 are displayed. In the environmental mark thumbnail display field 742, for the "○ NOT GRANTED WITH EMISSION RIGHTS, TYPE 2", the Eco Mark (registered trademark) 746, the carbon footprint mark 747, the Blue Engel Mark 748 and the Nordic Swan Mark (registered trademark) 749 are displayed. The carbon footprint mark 747 for both "○ GRANTED WITH EMISSION RIGHTS, TYPE 1" and "○ NOT GRANTED WITH EMISSION RIGHTS, TYPE 2" is displayed as "5.0 kg" as the $CO_2$ equivalent.

The carbon footprint mark 747 for both "○ GRANTED WITH EMISSION RIGHTS, TYPE 3" and "○ NOT GRANTED WITH EMISSION RIGHTS, TYPE 4" is displayed as "3.0 kg" as a carbon dioxide-equivalent emission amount. For marks other than the carbon footprint mark 747, the environmental mark thumbnail display field 742 for "○ GRANTED WITH EMISSION RIGHTS, TYPE 3" is the same as that for "○ GRANTED WITH EMISSION RIGHTS, TYPE 1", and the environmental mark thumbnail display field 742 for "○ NOT GRANTED WITH EMISSION RIGHTS, TYPE 4" is the same as that of "○ NOT GRANTED WITH EMISSION RIGHTS, TYPE 2".

Price of each cartridge of types 1 to 4 is indicated as TYPE 2<TYPE 1<TYPE 4<TYPE 3. Generally, a user who frequently uses consumables selects a toner cartridge granted with emission rights, for example, TYPE 1 or TYPE 3, and a user who less frequently uses consumables selects a toner cartridge not granted with emission rights, for example, TYPE 2 or TYPE 4, however, both users are able to select both toner cartridges.

In a case where a user who less frequently uses purchases an inexpensive cartridge for cost reduction, the user selects, for example, a transparent color toner cartridge of "○ NOT GRANTED WITH EMISSION RIGHTS, TYPE 4" among transparent color toner cartridges and manipulates the "TO NEXT SCREEN" icon 744, then a selection determination screen 75 is displayed.

Figure 7:
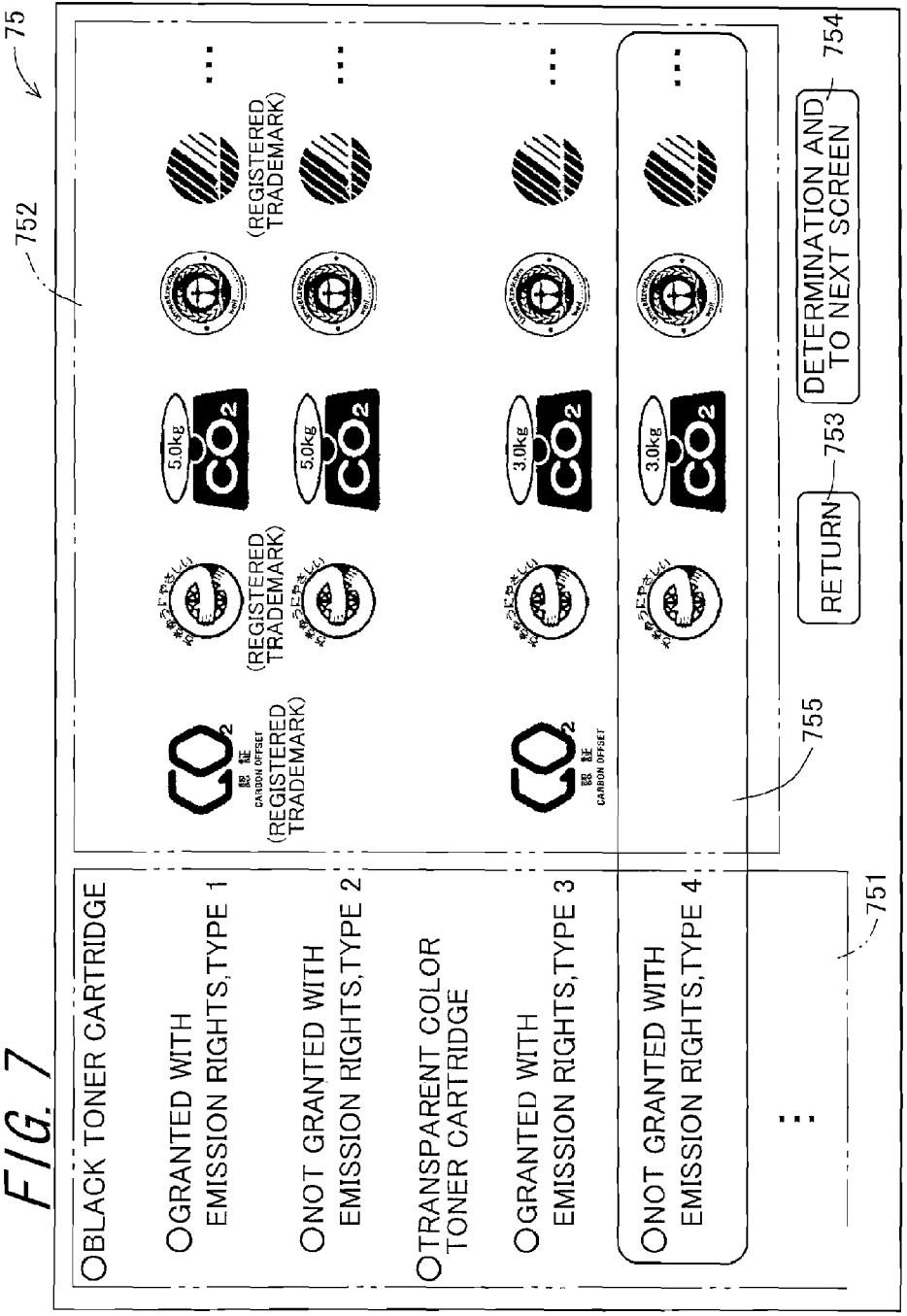
FIG. 7 is a diagram illustrating an example of a selection determination screen.

FIG. 7 is a diagram illustrating an example of the selection determination screen 75. The selection determination screen 75 is a screen for determining consumables selected on the consumables list screen 74. On the selection determination screen 75, a consumables list display field 751, an environmental mark thumbnail display field 752, a "RETURN" icon 753 and a "DETERMINATION AND TO NEXT SCREEN" icon 754 are provided. The consumables list display field 751, the environmental mark thumbnail display field 752 and the "RETURN" icon 753 are the same as the consumables list display field 741, the environmental mark thumbnail display field 742 and the "RETURN" icon 743 on the consumables list screen 74, each of which description is omitted for avoiding repetition. The "DETERMINATION AND TO NEXT SCREEN" icon 754 is a manipulation icon for determining selected consumables.

On the selection determination screen 75, a selection region 755 is also provided. The selection region 755 is an area showing a part of consumables selected on the consumables list screen 74. A background color of the selection region 755 is displayed in, for example, yellow which is different from a surrounding background color, for example, white. Therefore, a user is able to surely figure out which consumable item is selected.

When a user checks selected consumables with the selection region 755 to manipulate the "DETERMINATION AND TO NEXT SCREEN" icon 754, the control unit 501 causes the display unit 503 to display an ordering screen 76.

Figure 8:
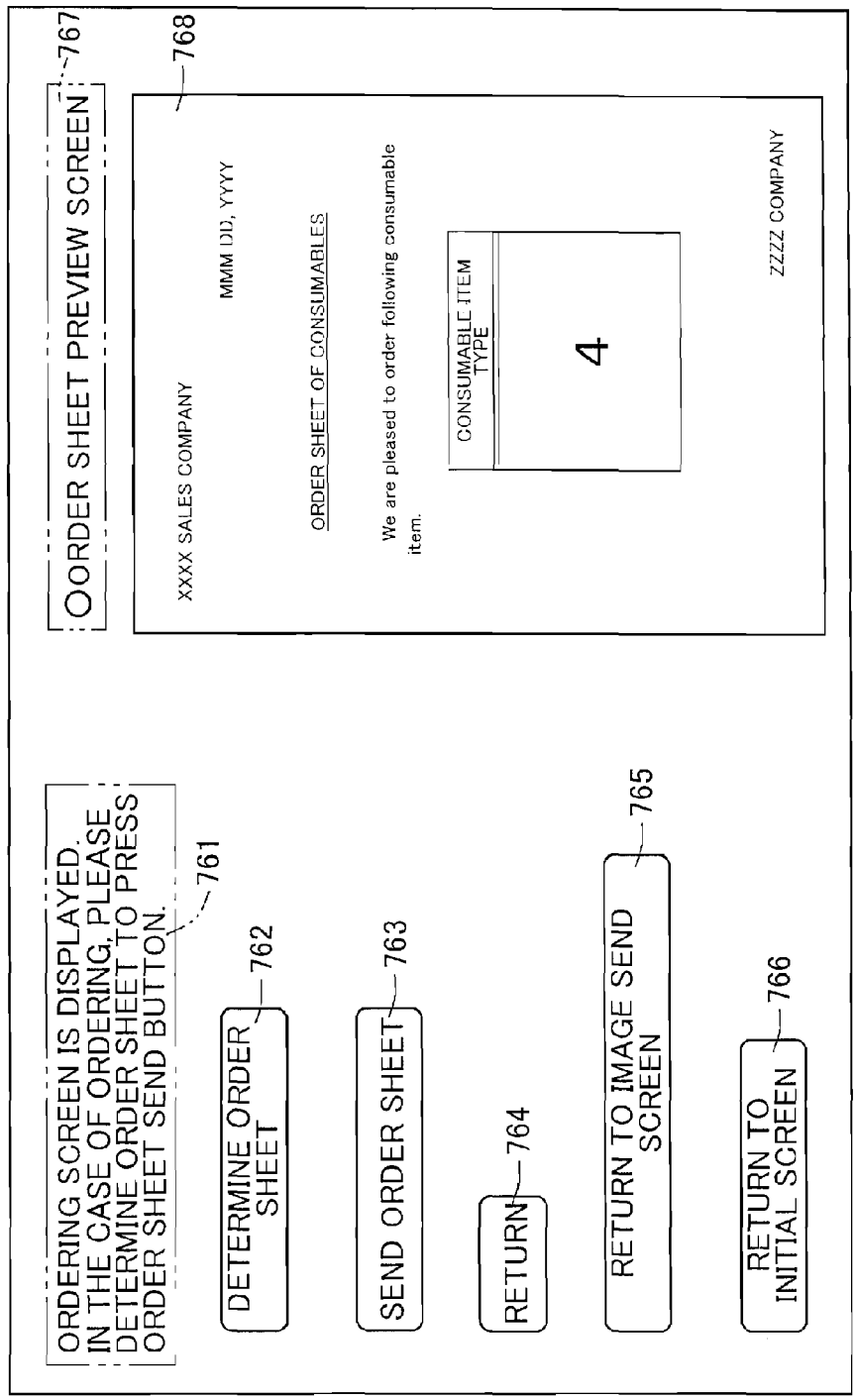
FIG. 8 is a diagram illustrating an example of an ordering screen.

FIG. 8 is a diagram illustrating an example of the ordering screen 76. On the ordering screen 76, a manipulation guidance field 761, a "DETERMINE ORDER SHEET" icon 762, a "SEND ORDER SHEET" icon 763, a "RETURN" icon 764, a "RETURN TO IMAGE SEND SCREEN" icon 765, a "RETURN TO INITIAL SCREEN" icon 766, an order sheet preview title field 767 and an order sheet preview screen field 768 are provided.

The manipulation guidance field 761 is a field displaying a message for guiding manipulation on the ordering screen 76, and in FIG. 8, a message is displayed that "ORDERING SCREEN IS DISPLAYED. IN THE CASE OF ORDERING, PLEASE DETERMINE ORDER SHEET TO PRESS ORDER SHEET SEND BUTTON." The "DETERMINE ORDER SHEET" icon 762 is a manipulation icon for determining details of an order sheet in a preview image that is displayed on the order sheet preview screen field 768. The "SEND ORDER SHEET" icon 763 is a manipulation icon for sending the determined order sheet to the server 101. The "RETURN" icon 764 is a manipulation icon for retuning to a previous screen. The "RETURN TO IMAGE SEND SCREEN" icon 765 is a manipulation icon for returning to the IMAGE SEND initial screen 71. The "RETURN TO INITIAL SCREEN" icon 766 is a manipulation icon for returning to an initial screen that is first displayed in the case of being operable after supplying power.

The order sheet preview title field 767 is a field displaying a title of a preview image that is displayed in the order sheet preview screen field 768, and in FIG. 8, displayed as "○ ORDER SHEET PREVIEW SCREEN". The order sheet preview screen field 768 is a screen area for displaying an order sheet as a preview image. In the preview image that is displayed in the order sheet preview screen field 768 shown in FIG. 8, a destination: "XXXX SALES COMPANY", a date ordered: "MMM DD, YYYY", a subject: "ORDER SHEET OF CONSUMABLES", a text: "We are pleased to order following consumable item.", identification information of the ordered item: "CONSUMABLE ITEM TYPE 4", and a name of an ordering party: "ZZZZ COMPANY" are displayed.

When the control unit 501 is informed by the input unit 504 that a user manipulates the "DETERMINE ORDER SHEET" icon 762 and manipulates the "SEND ORDER SHEET" icon 763, the control unit 501 prepares an order sheet to send the prepared order sheet to the server 101 via the connection unit 505. The server 101 prepares, when receiving the order sheet, order sheet receipt notification to send the prepared order sheet receipt notification to the image forming apparatus 1. The control unit 501 displays, when receiving the order sheet receipt notification from the server 101 via the connection unit 505, the order sheet receipt notification as an order sheet reception screen 77. The control unit 501 serves as an order sheet preparation unit. The control unit 501 and the connection unit 505 serve as an ordering unit. The connection unit 505 serves as a sending unit and a receiving unit.

Figure 9:
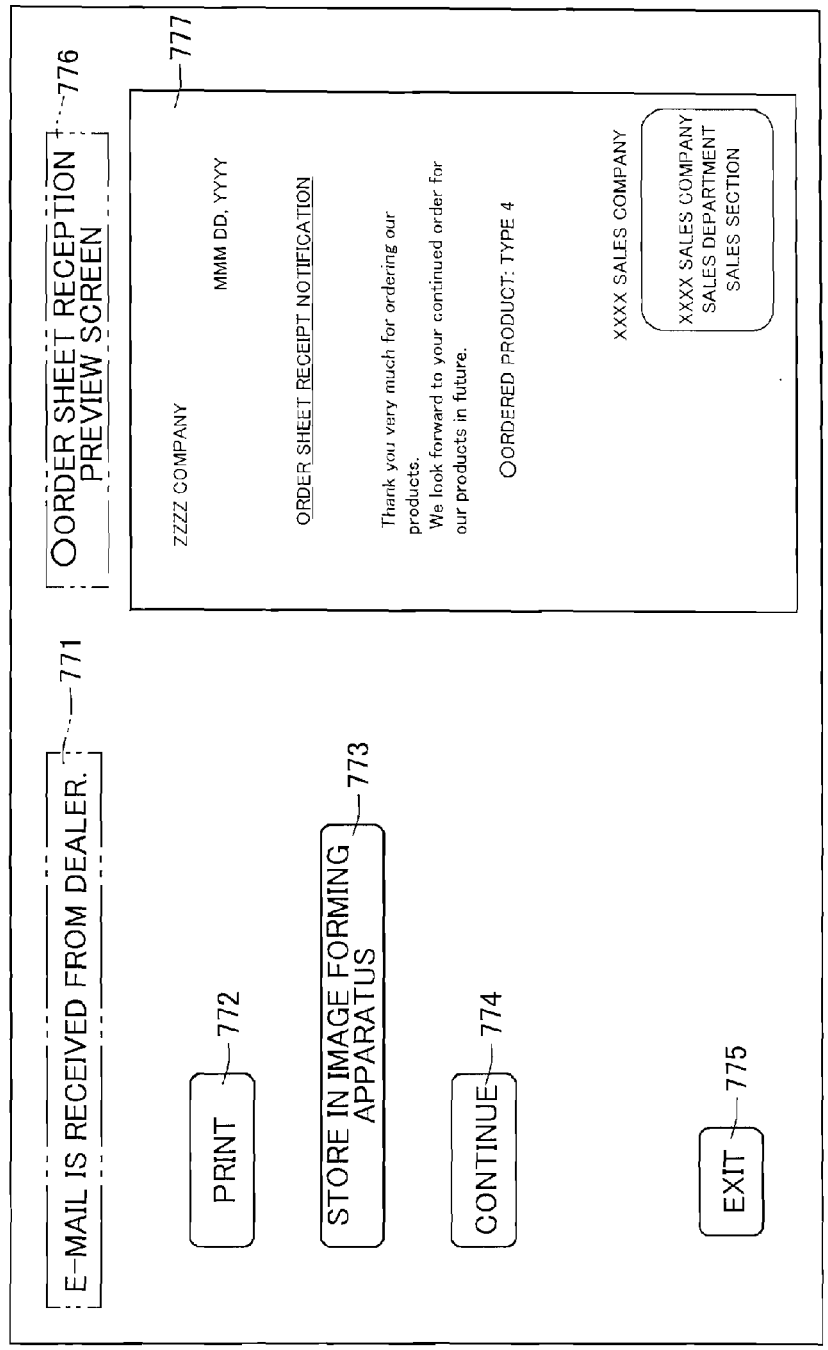
FIG. 9 is a diagram illustrating an example of the order sheet reception screen.

FIG. 9 is a diagram illustrating an example of the order sheet reception screen 77. On the order sheet reception screen 77, an order sheet received message field 771, a "PRINT" icon 772, a "STORE IN IMAGE FORMING APPARATUS" icon 773, a "CONTINUE" icon 774, an "EXIT" icon 775, an order sheet reception preview title field 776 and an order sheet reception preview screen field 777 are provided.

The order sheet received message field 771 is a field displaying a message indicating that the order sheet receipt notification is received, and in FIG. 9, a message is displayed that "E-MAIL IS RECEIVED FROM DEALER." The "PRINT" icon 772 is a manipulation icon for printing the received order sheet receipt notification. The "STORE IN IMAGE FORMING APPARATUS" icon 773 is a manipulation icon for storing the received order sheet receipt notification in the storage unit 502. The "CONTINUE" icon 774 is a manipulation icon for continuing to order consumables.

The "EXIT" icon 775 is a manipulation icon for terminating ordering process of consumables. When the "EXIT" icon 775 is manipulated, the control unit 501 erases the server-provided ordering processing program that is stored in the storage unit 502 and causes the display unit 503 to display an initial screen.

The order sheet reception preview title field 776 is a field displaying a title of a preview image that is displayed on the order sheet reception preview screen field 777, and in FIG. 9, displayed as "○ ORDER SHEET RECEPTION PREVIEW SCREEN". The order sheet reception preview screen field 777 is a screen area for displaying an order sheet receipt notification as a preview image. In the preview image displayed in the order sheet reception preview screen field 777 shown in FIG. 9, a destination: "ZZZZ COMPANY", a date received: "MMM DD, YYYY", a subject: "ORDER SHEET RECEIPT NOTIFICATION", a text: "Thank you very much for ordering our products. We look forward to your continued order for our products in future.", identification information of the ordered item: "○ ORDERED PRODUCT: TYPE 4", and a name of an ordered party: "XXXX SALES COMPANY (XXXX SALES COMPANY, SALES DEPARTMENT, SALES SECTION)" are displayed.

Figure 10:
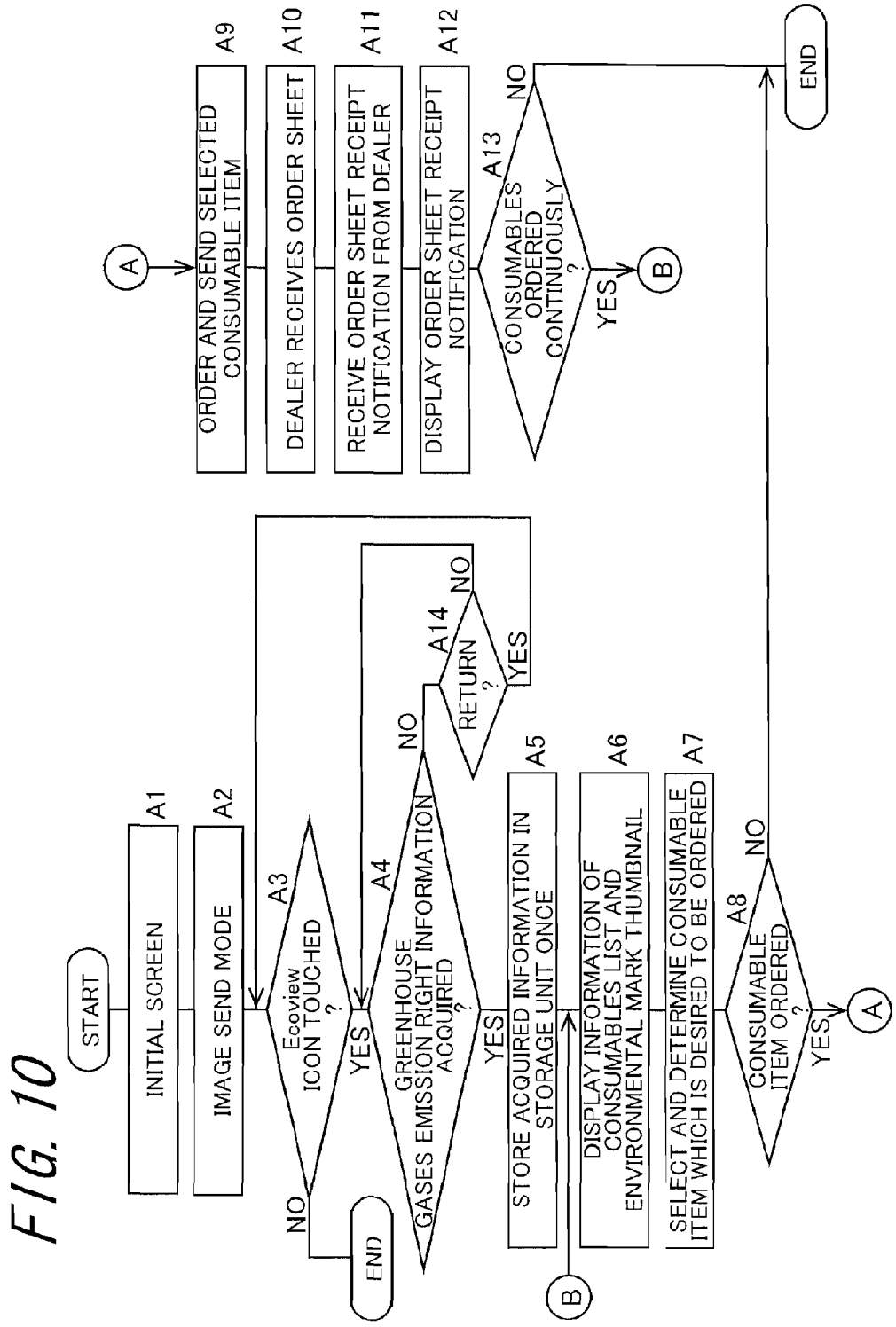
FIG. 10 is a flowchart illustrating a processing sequence of consumables ordering process that is executed in the consumables ordering system.

FIG. 10 is a flowchart illustrating a processing sequence of consumables ordering process that is executed in the consumables ordering system 100. When the image forming apparatus 1 and the server 101 are powered up, and all of them are operable, the process proceeds to step A1.

In step A1, the control unit 501 causes the display unit 503 to display an initial screen. In the initial screen, the main menu icons including the "IMAGE SEND" icon 711 are displayed. When a user manipulates the "IMAGE SEND" icon 711, the process proceeds to step A2. In step A2, the control unit 501 sets a mode of the image forming apparatus 1 to an "IMAGE SEND" mode and causes the display unit 503 to display the IMAGE SEND initial screen 71 as shown in FIG. 4B.

In step A3, the control unit 501 determines whether or not an Ecoview icon is touched. When the "Ecoview" icon 712 is manipulated, it is determined that the Ecoview icon is touched, then the process proceeds to step A4, and when the "Ecoview" icon 712 is not manipulated, it is determined that the Ecoview icon is not touched, then the consumables ordering process is terminated.

In step A4, the control unit 501 determines whether or not to acquire greenhouse gases emission right information. Specifically, the control unit 501 first causes the display unit 503 to display the selection screen 72 shown in FIG. 5. When a device desired to acquire emission right information is selected on the selection screen 72 and the "SEND" icon 726 is manipulated, the control unit 501 determines to acquire the greenhouse gases emission right information, and the process proceeds to step A5. When the device desired to acquire emission right information is not selected on the selection screen 72, or the "SEND" icon 726 is not manipulated, the control unit 501 determines not to acquire the greenhouse gases emission right information, and the process proceeds to step A14.

In step A5 that is an acquisition step, the control unit 501 acquires consumables information, and once stores, that is, memorizes the acquired consumables information in the storage unit 502. Specifically, the control unit 501 requests consumables information of consumables available in the image forming apparatus 1 to the server 101 via the connection unit 505. The server 101 reads, when the consumables information is requested from the image forming apparatus 1, information of consumables granted with emission rights and information of consumables not granted with emission rights of consumables that are available in the image forming apparatus 1 from among consumables information stored in a server storage unit, and sends the read information of consumables granted with emission rights and information of consumables not granted with emission rights to the image forming apparatus 1. The control unit 501 stores, in the case of receiving the information of consumables granted with emission rights and the information of consumables not granted with emission rights via the connection unit 505, the received information of consumables granted with emission rights and information of consumables not granted with emission rights in the storage unit 502.

At this time, the control unit 501 receives the server-provided ordering processing program from the serer 101 together with the consumables information, and stores the received server-provided ordering processing program in the storage unit 502. Subsequently, the control unit 501 then executes the sever-provided ordering processing program that is stored in the storage unit 502 until ordering process of consumables is terminated, thereby continuing the ordering process of consumables.

In step A6 that is a displaying step, the control unit 501 performs information display of a consumables list and an environmental mark thumbnail. Namely, the control unit 501 causes the display unit 503 to display information of consumables granted with emission rights and information of consumables not granted with emission rights that are acquired from the server 101 as the consumables list screen 74 shown in FIG. 6.

In step A7 that is a selection step, a user selects and determines a consumable item which is desired to be ordered. Namely, the user selects a consumable item which is desired to be ordered, that is, a consumable item that is desired to be purchased from among consumables that are displayed in the consumables list display field 741 on the consumables list screen 74, and manipulates the "TO NEXT SCREEN" icon 744. When the consumables list screen 74 is manipulated, the control unit 501 causes the display unit 503 to display the selection determination screen 75 shown in FIG. 7. When the user manipulates the "DETERMINATION AND TO NEXT SCREEN" icon 754 on the selection determination screen 75, the control unit 501 causes the display unit 503 to display the ordering screen 76 shown in FIG. 8. When the user manipulates the "DETERMINE ORDER SHEET" icon 762 on the ordering screen 76, the control unit 501 determines details of an order.

In step A8, the control unit 501 determines whether or not to order consumables. Specifically, when a user manipulates the "SEND ORDER SHEET" icon 763 on the ordering screen 76, the control unit 501 determines that the consumable item is ordered, and the process proceeds to step A9. When the user does not manipulate the "SEND ORDER SHEET" icon 763 on the ordering screen 76 and manipulates the "RETURN" icon 764, the "RETURN TO IMAGE SEND SCREEN" icon 765 or the "RETURN TO INITIAL SCREEN" icon 766, the control unit 501 determines that the consumable item is not ordered, and then terminates the consumables ordering process.

In step A9 that is an ordering step, the control unit 501 sends an order of the selected consumable item. Specifically, the control unit 501 sends to the serer 101 via the connection unit 505 an order sheet that is displayed as a preview image in the order sheet preview screen field 768 on the ordering screen 76. In step A10, a dealer receives the order sheet. Namely, the serer 101 provided at the dealer receives the order sheet that is sent from the image forming apparatus 1.

The server 101 generates order sheet receipt notification in response to the received order sheet, and sends the generated order sheet receipt notification to the image forming apparatus 1.

In step A11, the control unit 501 receives order sheet receipt notification from a dealer. Namely, the control unit 501 receives the order sheet receipt notification from the server 101 provided at the dealer via the connection unit 505. In step A12, the control unit 501 performs a display of the order sheet receipt notification that is received from the server 101 as the order sheet reception screen 77 shown in FIG. 9.

In step A13, the control unit 501 determines whether or not to continuously order consumables. When a user manipulates the "CONTINUE" icon 774 on the order sheet reception screen 77, the control unit 501 determines that the consumables are continuously ordered, and the process returns to step A6. When the user does not manipulate the "CONTINUE" icon 774 on the order sheet reception screen 77 and manipulates the "EXIT" icon 775, the control unit 501 determines that consumables are not continuously ordered, and then terminates the consumables ordering process.

Note that, the above-described consumables ordering process may be performed from warm-up of the image forming apparatus 1 until becoming a state being ready to be printable (hereinafter, also referred to as "Ready"), or may be performed during a print job (hereinafter, also referred to as "JOB"). Confirmation process is performed during the either period, thereby successfully having an effect that another user uses the image forming apparatus 1 without being disturbed.

As the display unit 503 of the embodiment a liquid crystal display, an organic EL (Electro-Luminescence) display, a plasma display, a plasma tube array display, an electronic sheet display including an electrophoresis type, and an electron emission display are usable.

In step A14, the control unit 501 determines whether or not to return. The control unit 501 determines to return when the "RETURN" icon 725 is manipulated, so that the process returns to step A3, and determines not to return when the "RETURN" icon 725 is not manipulated, so that the process returns to step A4.

In the above-described embodiment, the image forming apparatus 1 receives from the server 101 the server-provided ordering processing program among programs to be executed in the image forming apparatus 1 together with consumables information, and stores in the storage unit 502 and executes the received server-provided ordering processing program, however, may store the server-provided ordering processing program in the storage unit 502 of the image forming apparatus 1 from the start without being received from the server 101. Note that, even in either case, it needs to store in the storage unit 502 in advance a program for requesting consumables information to the server 101, then receiving the consumables information and the server-provided ordering processing program to be stored in the storage unit 502.

In this manner, the control unit 501 and the connection unit 505 acquire information of consumables granted with emission rights and information of consumables not granted with emission rights of consumables usable in the image forming apparatus 1 from the server 101 that stores information of consumables granted with emission rights indicating consumables granted with emission rights to which emission rights of greenhouse gases are granted and information of consumables not granted with emission rights indicating consumables not granted with emission rights to which emission rights of greenhouse gases are not granted. The display unit 503 displays the information of consumables granted with emission rights and the information of consumables not granted with emission rights that are acquired by the control unit 501 and the connection unit 505. The input unit 504 selects consumables to be ordered from among the consumables granted with emission rights indicated by the information of consumables granted with emission rights and the consumables not granted with emission rights indicated by the information of consumables not granted with emission rights that are displayed on the display unit 503. The control unit 501 and the connection unit 505 then order the consumables selected by the input unit 504 to the server 101.

Therefore, it is possible to promote sales of the image forming apparatus 1 granted with emission rights which enables use of not only consumables granted with emission rights but also consumables not granted with emission rights according to use frequency of the image forming apparatus 1 by a user. Additionally, it is possible to broaden user's choices for contributions to environment, thus enabling cost reduction without paying cost of emission rights for consumables extremely less frequently used by the user. Further, a user with high environmental awareness is able to acknowledge at one view environmental performances of consumables to purchase in relief consumables granted with emission rights, and eventually able to suppress a greenhouse gas yield to contribute to prevention of global warming. Moreover, a dealer of consumables is also able to make an appeal of addressing environmental issues to a user, which leads to increase of sales of consumables.

Further, the information of consumables granted with emission rights and the information of consumables not granted with emission rights include the Carbon Offset Mark (registered trademark) 745. Therefore, a user is able to select consumables in consideration of $CO_2$ equivalents of consumables to purchase consumables with high environmental performances so that it is possible to respond to user's environmental awareness. Moreover, a user with high environmental awareness is able to acknowledge at one view environmental performances of consumables, and it is possible to respond to the user's needs, which leads to increase of sales of consumables for a dealer or a leasing store of the consumables.

Additionally, the information of consumables granted with emission rights and the information of consumables not granted with emission rights further include consumables identification information that identifies consumables, and the display unit 503 displays carbon footprint information for each piece of the consumables identification information. Therefore, a user is able to get consumables information of consumables.

Further, the control unit 501 and the connection unit 505 include the control unit 501 for preparing an order sheet for ordering consumables selected by the input unit 504, and the connection unit 505 for sending the order sheet prepared by the control unit 501 to the server 101. Therefore, a user is able to make a written order with an order sheet, and it is also possible for the user to check the prepared order sheet, thereafter ordering.

Further, the connection unit 505 is included for receiving order sheet receipt notification that is returned in response to the order sheet sent by the connection unit 505, and the display unit 503 displays the order sheet receipt notification received by the connection unit 505. Therefore, a user is able to confirm receipt of the order sheet by the server 101.

Further, the display unit 503 is composed of a touch panel. Therefore, the touch panel integrally provided with a manipulation unit is used as the display unit 503 of the image forming apparatus 1 so that it is possible to easily acquire directly from the server 101 and display consumables information. Additionally, it is possible to easily select consumables having further improved environmental performances, which facilitates ordering to a dealer or a leasing store of consumables.

Further, a consumables ordering system includes the image forming apparatus 1, and the server 101 that stores information of consumables that are used in the image forming apparatus 1 including consumables granted with emission rights indicating consumables granted with emission rights to which emission rights of greenhouse gases are granted and consumables not granted with emission rights indicating consumables not granted with emission rights to which emission rights of greenhouse gases are not granted. The image forming apparatus 1 includes the control unit 501 and the connection unit 505, the display unit 503, and the input unit 504. In the case of ordering consumables in the consumables ordering system, the control unit 501 and the connection unit 505 acquire from the server 101 information of consumables granted with emission rights and information of consumables not granted with emission rights of consumables capable of being used in the image forming apparatus 1. The display unit 503 displays the information of consumables granted with emission rights and the information of consumables not granted with emission rights that are acquired by the control unit 501 and the connection unit 505. The input unit 504 selects consumables to be ordered from among consumables granted with emission rights indicated by the information of consumables granted with emission rights and consumables not granted with emission rights indicated by the information of consumables not granted with emission rights that are displayed on the display unit 503. Then, the control unit 501 and the connection unit 505 order the consumables selected by the input unit 504 to the server 101.

Therefore, it is possible to promote sales of the image forming apparatus 1 granted with emission rights which enables use of not only consumables granted with emission rights but also consumables not granted with emission rights according to use frequency of the image forming apparatus 1 by a user. Additionally, it is possible to broaden user's choices for contributions to environment, thus enabling cost reduction without paying cost of emission rights for consumables extremely less frequently used by a user. Further, a user with high environmental awareness is able to acknowledge at one view environmental performances of consumables to purchase in relief consumables granted with emission rights, and eventually able to suppress a greenhouse gas yield to contribute to prevention of global warming. Moreover, a dealer of consumables is also able to make an appeal of addressing environmental issues to a user, which leads to increase of sales of consumables.

Further, in the case of ordering consumables in the consumables ordering system including the image forming apparatus 1, and the server 101 that stores information of consumables that are used in the image forming apparatus 1 including consumables granted with emission rights indicating consumables granted with emission rights to which emission rights of greenhouse gases are granted and consumables not granted with emission rights indicating consumables not granted with emission rights to which emission rights of greenhouse gases are not granted, information of consumables granted with emission rights and information of consumables not granted with emission rights of consumables capable of being used in the image forming apparatus 1 are acquired from the server 101 in step A5 in the flowchart shown in FIG. 10. In step A6, the information of consumables granted with emission rights and the information of consumables not granted with emission rights that are acquired in step A5 are displayed on the display unit. In step A7, consumables to be ordered are selected from among consumables granted with emission rights indicated by the information of consumables granted with emission rights and consumables not granted with emission rights indicated by the information of consumables not granted with emission rights that are displayed on the display unit in step A6. Then, in step A9, the consumables selected in step A7 are ordered to the server 101.

Therefore, it is possible to promote sales of the image forming apparatus 1 granted with emission rights which enables use of not only consumables granted with emission rights but also consumables not granted with emission rights according to use frequency of the image forming apparatus 1 by a user. Additionally, it is possible to broaden user's choices for contributions to environment, thus enabling cost reduction without paying cost of emission rights for consumables extremely less frequently used by a user. Further, a user with high environmental awareness is able to acknowledge at one view environmental performances of consumables to purchase in relief consumables granted with emission rights, and eventually able to suppress a greenhouse gas yield to contribute to prevention of global warming. Moreover, a dealer of consumables is also able to make an appeal of addressing environmental issues to a user, which leads to increase of sales of consumables.

The display unit 503 of the embodiment may be applied to products developed on the premise of uses other than in general households such as business equipment (corporations (companies or schools, government agencies)) and consumer equipment (electronic devices and equipment related to audiovisual and communications, or in a terminal, those intended for home use or the general consumer use, or refer to the product/specifications that are developed/designed on such a premise).

Additionally, in the embodiment, description has been made using a touch panel, however, gesture input using a Ubi-Finger device or the like may be used in place of the touch panel.

The technology is not limited to the exemplary embodiments described above, but various modifications can be made within the scope of the appended claims, and embodiments derived from arbitrary combination of the technical solution respectively disclosed in the different exemplary embodiments are also within the technical scope of the technology.

The technology may be embodied in other specific forms without departing from the spirit or essential characteristics thereof. The present embodiments are therefore to be considered in all respects as illustrative and not restrictive, the scope of the technology being indicated by the appended claims rather than by the foregoing description and all changes which come within the meaning and the range of equivalency of the claims are therefore intended to be embraced therein.

What is claimed is:

1. An image forming apparatus configured to transmit orders for consumables granted with emission rights and consumables not granted with emission rights, comprising:
   an acquisition unit that acquires information of consumables granted with emission rights and information of consumables not granted with emission rights of consumables capable of being used in the image forming apparatus, from a server that stores information of consumables granted with emission rights indicating consumables granted with emission rights to which emission rights of greenhouse gases are granted and information of consumables not granted with emission rights indicating consumables not granted with emission rights to which emission rights of greenhouse gases are not granted, the information of consumables granted with emission rights and the information of consumables not granted with emission rights include carbon footprint information indicating carbon footprint of consumables;

a display unit that displays the information of consumables granted with emission rights and the information of consumables not granted with emission rights that are acquired by the acquisition unit;

a selection unit that selects consumables to be ordered from among consumables granted with emission rights indicated by the information of consumables granted with emission rights and consumables not granted with emission rights indicated by the information of consumables not granted with emission rights that are displayed on the display unit;

an ordering unit that transmits said orders for the consumables selected by the selection unit to the server; and an image forming unit printing image information on a sheet using the consumables, wherein said image forming apparatus is configured such that at least said display unit and said selection unit display and select consumables in parallel with the image forming unit performing printing of image information.

2. The image forming apparatus of claim 1, wherein the information of consumables granted with emission rights and the information of consumables not granted with emission rights further include consumables identification information that identifies consumables, and the display unit displays carbon footprint information for each piece of the consumables identification information.

3. The image forming apparatus of claim 1, wherein the ordering unit comprises:

an order sheet preparation unit that prepares an order sheet for ordering consumables selected by the selection unit; and a sending unit that sends the order sheet prepared by the order sheet preparation unit to the server.

4. The image forming apparatus of claim 1, further comprising a receiving unit that receives order sheet receipt notification that is returned in response to an order sheet sent by the sending unit, wherein the display unit displays the order sheet receipt notification received by the receiving unit.

5. The image forming apparatus of claim 1, wherein the display unit is composed of a touch panel.

6. A consumables ordering system comprising:

an image forming apparatus configured to transmit orders consumables granted with emission rights and consumables not granted with emission rights; and a server that stores information of consumables that are used in the image forming apparatus including consumables granted with emission rights indicating consumables granted with emission rights to which emission rights of greenhouse gases are granted and consumables not granted with emission rights indicating consumables not granted with emission rights to which emission rights of greenhouse gases are not granted, the information of consumables granted with emission rights and the information of consumables not granted with emission rights include carbon footprint information indicating carbon footprint of consumables, the image forming apparatus comprising:

an acquisition unit that acquires from a server information of consumables granted with emission rights and information of consumables not granted with emission rights of consumables capable of being used in the image forming apparatus;

a display unit that displays the information of consumables granted with emission rights and the information of consumables not granted with emission rights that are acquired by the acquisition unit;

a selection unit that selects consumables to be ordered from among consumables granted with emission rights indicated by the information of consumables granted with emission rights and consumables not granted with emission rights indicated by the information of consumables not granted with emission rights that are displayed on the display unit;

an ordering unit that transmits said orders for the consumables selected by the selection unit to the server; and an image forming unit printing image information on a sheet using the consumables, wherein said image forming apparatus is configured such that at least said display unit and said selection unit display and select consumables in parallel with the image forming unit performing printing of image information.

7. A consumables ordering method executed in a consumables ordering system comprising an image forming apparatus configured to transmit orders for consumables granted with emission rights and consumables not granted with emission rights, and a server that stores information of consumables that are used in the image forming apparatus including consumables granted with emission rights indicating consumables granted with emission rights to which emission rights of greenhouse gases are granted and consumables not granted with emission rights indicating consumables not granted with emission rights to which emission rights of greenhouse gases are not granted, the information of consumables granted with emission rights and the information of consumables not granted with emission rights include carbon footprint information indicating carbon footprint of consumables, the image forming apparatus comprising an acquisition unit, a display unit, a selection unit, and an ordering unit, the consumables ordering method comprising:

an acquisition step, performed by said acquisition unit, of acquiring from the server information of consumables granted with emission rights and information of consumables not granted with emission rights of consumables capable of being used in the image forming apparatus;

a displaying step, performed by said display unit, of displaying the information of consumables granted with emission rights and the information of consumables not granted with emission rights that are acquired in the acquisition step;

a selection step, performed by said selection unit, of selecting consumables to be ordered from among consumables granted with emission rights indicated by the information of consumables granted with emission rights and consumables not granted with emission rights indicated by the information of consumables not granted with emission rights that are displayed on the display unit in the displaying step;

an ordering step, performed by said ordering unit, of transmitting said orders for the consumables selected in the selection step to the server; and printing image information on a sheet using the consumables, wherein at least said displaying step and selection step display and select consumables in parallel with the image forming apparatus performing printing of image information.

* * * * *